United States Patent [19]
Clark

[11] Patent Number: 5,881,495
[45] Date of Patent: Mar. 16, 1999

[54] MULTI-PURPOSE TURF STAKE AND COMBINATION TURF STAKE AND FRAME CONSTRUCTION ASSEMBLY

[75] Inventor: J. Matthew Clark, Reading, Mich.

[73] Assignee: Roll-Tech, Inc., Reading, Mich.

[21] Appl. No.: 965,238

[22] Filed: Nov. 6, 1997

[51] Int. Cl.⁶ ............................. A01G 17/06; A45F 3/44
[52] U.S. Cl. ........................... 47/48.5; 52/155; 52/165; 248/156; 248/530; 135/118
[58] Field of Search ........................... 52/165, 155, 298; 248/530, 156; 135/118; 47/48.5

[56] References Cited

U.S. PATENT DOCUMENTS

| | | | |
|---|---|---|---|
| 291,927 | 1/1884 | Newton | 52/165 |
| 318,428 | 5/1885 | Harrod | 52/165 |
| 891,448 | 6/1908 | Snider | 52/165 X |
| 3,263,692 | 8/1966 | Questi et al. | 135/118 |
| 3,342,444 | 9/1967 | Nelson | 52/165 |
| 3,579,908 | 5/1971 | Morgan | 47/48.5 X |
| 3,767,355 | 10/1973 | Anderson | 248/156 X |
| 4,135,668 | 1/1979 | Winkler et al. . | |
| 4,153,380 | 5/1979 | Hartman | 47/48.5 X |
| 4,324,388 | 4/1982 | Klaser | 52/165 X |
| 4,407,505 | 10/1983 | Kendziorski . | |
| 4,870,781 | 10/1989 | Jones | 47/48.5 X |
| 4,874,149 | 10/1989 | Miceli | 52/165 X |
| 4,922,653 | 5/1990 | Stone | 47/48.5 X |
| 4,923,164 | 5/1990 | Stenberg | 52/165 X |
| 5,224,311 | 7/1993 | Pearce . | |
| 5,226,829 | 7/1993 | Jones . | |
| 5,279,073 | 1/1994 | Czebieniak | 47/48.5 |
| 5,349,775 | 9/1994 | Mondares . | |
| 5,560,137 | 10/1996 | Herring . | |
| 5,605,010 | 2/1997 | Furlong et al. | 47/48.5 |
| 5,687,946 | 11/1997 | Cho | 248/530 |
| 5,709,366 | 1/1998 | Speece | 52/165 X |

*Primary Examiner*—Robert Canfield
*Attorney, Agent, or Firm*—Gifford, Krass, Groh, Sprinkle, Anderson & Citkowksi, P.C.

[57] ABSTRACT

A combination turf stake and frame construction assembly for establishing a framework construction upon a ground surface. The turf stake includes an elongate spike portion having a first inserting end, a second supporting end and a plurality of vane portions projecting in circumferentially spaced apart and axially directed fashion substantially along the spike portion. A substantially polygonal shaped body defining a hollowed and interior cavity is integrally formed atop the second supporting end of the turf stake and substantially corresponds to a likewise polygonally shaped and inserting end of a selected elongate frame construction member so as to engage the elongate member in a friction fit manner. A plurality of turf stakes and frame construction members can be employed to assemble any desired framework construction. Both the turf stakes and frame construction members can be further internally hollowed to facilitate the communication of fluid, such as water, through an interconnecting network of the assembly and to provide irrigation and watering to plants or like vegetation.

13 Claims, 6 Drawing Sheets

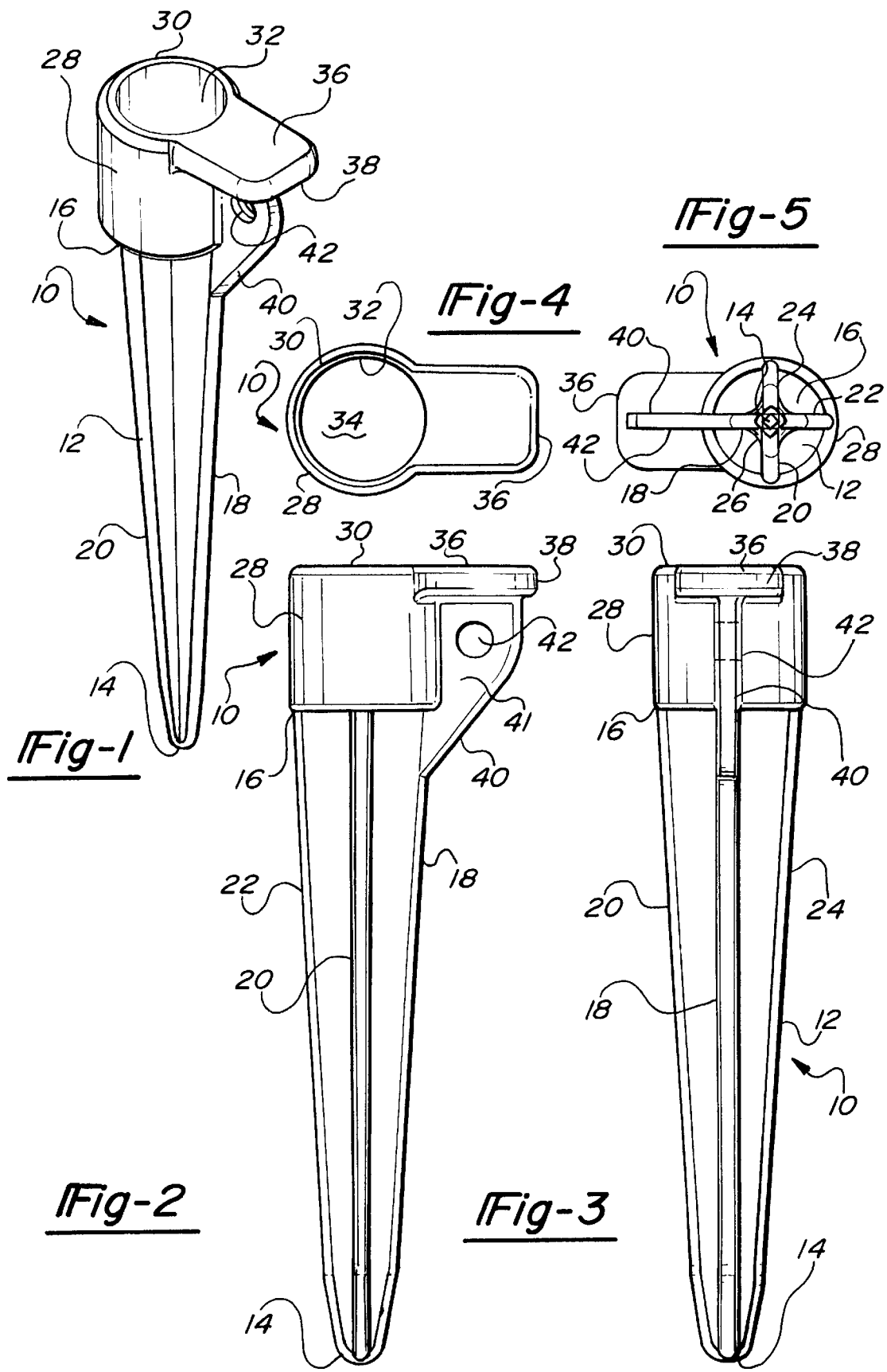

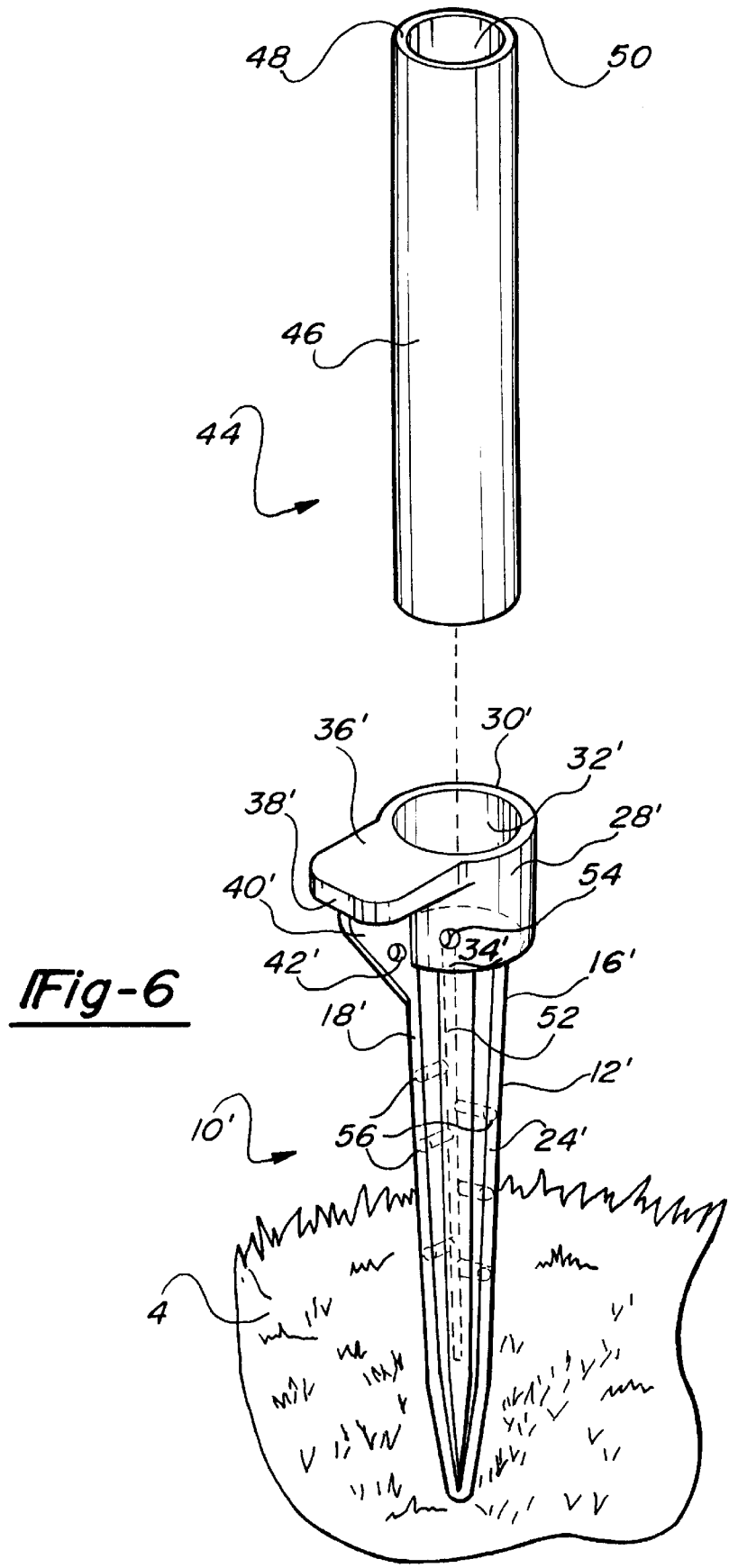

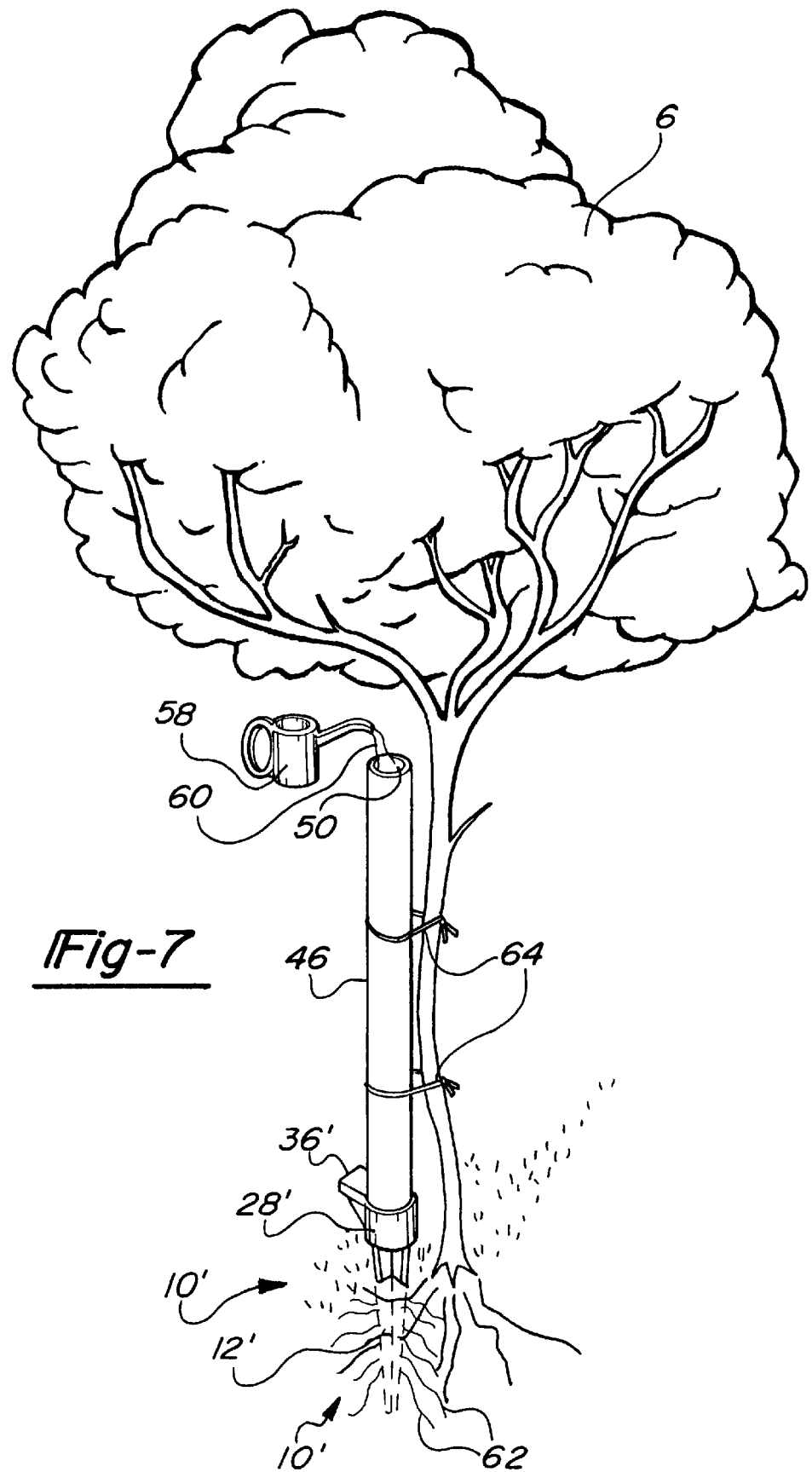

MULTI-PURPOSE TURF STAKE AND COMBINATION TURF STAKE AND FRAME CONSTRUCTION ASSEMBLY

BACKGROUND OF THE INVENTION

1. Field of the Invention

The present invention relates generally to underground staking devices and, more particularly, to a novel type of turf staking device which is capable of being secured in an upwardly extending fashion from a selected underground location and is further capable of supporting a plurality of individual framing elements in the construction of an above-ground frame assembly.

2. Description of the Prior Art

Underground staking devices are well known in the art, the purposes for which traditionally have been to establish a secured ground position for attachment of a rope or cord. The most basic of such staking devices traditionally has been the large nail or spike which includes an elongate shaft portion and a flattened head portion, the spike being driven into the ground, usually at an angle, and providing a seating location between an upper end of the shaft and the flattened head for receiving a loop or cord.

More recent staking devices include such as is taught in U.S. Pat. No. 5,226,829, issued to Jones, which discloses a staking device capable of establishing a prolonged or permanent ground position at all times. The staking device of Jones discloses a longitudinal stake member which is attached to an open cylindrical housing member. A curved or hook-like member extends within the open cylindrical housing and permits the attachment of a cord or line as previously described. The staking device is further characterized by a pair of barbs which are capable of extending from the stake member in acute angle fashion such that the stake may be relatively easily driven into the ground, but may not be easily withdrawn in a reverse direction.

U.S. Pat. No. 5,349,775, issued to Mondares, teaches an adjustable ground-inserted fishing rod holder for supporting a fishing rod at a desired angle. An elongate stake portion is capable of being driven into the ground and further includes a pair of supports which are coupled to the stake and are capable of being adjusted to accommodate fishing poles of varying lengths. Measurement indicia is placed along a selected side of the stake and an optional oscillator assembly may also be provided for selectively oscillating an associated fishing pole.

Finally, U.S. Pat. No. 4,407,505, issued to Kendziorski, teaches a portable and collapsible practice gold flagstaff with stowable ground spike. The spike is capable of being held within a hollow tubular housing of the assembly in a storage position and is capable of being secured in an oppositely extending fashion from a weighted base portion in a second installed position so that it may be driven into the ground surface. The flagstaff is further provided as an elongate member which receives a flag portion at an upper end thereof.

SUMMARY OF THE PRESENT INVENTION

The present invention is a turf stake and frame construction assembly for facilitating the assembly of an above-ground framework at any desired location upon a ground surface. The turf stake includes an elongated spike portion having a first inserting end, a second supporting end and a plurality of four vane portions which project in a circumferentially spaced apart and axially directed fashion along the spike portion from the first inserting end to the second supporting end. The turf stake further includes a foundation means in the form of a substantially cylindrical shaped body defined by a hollowed and interior cavity which is integrally formed upon the second supporting end of the spike portion and is capable of receiving, in a frictionally engaging manner, a selected end of an elongate member of the frame construction assembly so that the elongate member extends in an upward and axial direction away from the turf stake.

The turf stake further includes a planar surface extending in laterally directed fashion from an upper end of the hollowed and cylindrical shaped body and with respect to the spike portion, the planar surface providing a receiving surface for absorbing driving forces created by downward motion of a blunt-headed object, such as a mallet, hammer or other heavy-headed tool, and for imparting the driving forces to the spike portion to facilitate engagement of the turf stake into the underground location. A webbed reinforcing portion also extends from an underside of the planar surface and to exterior connecting surfaces established between the cylindrical shaped body and the second supporting end of the spike portion.

In various preferred applications, any number of turf stakes and elongate members can be employed in the assembly of varying structures, ranging from a single turf stake and associated vertically extending member for providing support to small trees and vegetation, to multiple stakes and interconnecting elongate members for creating such above-ground structures as sign assemblies, irrigation systems and the like. Additional embodiments of the present invention include the provision of single stake and frame construction assemblies which are modified to provide upwardly extending enclosures for holding such objects as aluminum cans or bottles and also for holding hunting arrows and similar elongated objects.

In the instance of watering or irrigation systems, the turf stakes are provided with interior and axially extending passageways formed within central portions of the spike and which communicate with an inlet formed in a recessed base surface of the cylindrical shaped body and a series of individual outlets extending from the axial passageway and to selected surface locations of the extending spike portion. The elongate members are likewise internally hollowed and permit water or other liquids to be either poured or supplied through a pressurized input into an interconnecting network of such members. The water can in this instance be applied through additional apertures formed along the extending surfaces of the members and/or through the passageways formed within the turf stakes in order to provide enhanced watering and/or irrigation of vegetation being grown with the support of the turf stakes and frame construction assemblies.

BRIEF DESCRIPTION OF THE DRAWINGS

Reference will now be made to the attached drawings, when read in combination with the following specification, wherein like reference numerals refer to like parts throughout the several views, and in which:

FIG. 1 is a perspective view of a turf stake for use in the frame construction assembly according to the present invention;

FIG. 2 is a first two-dimensional and side elevational view of the turf stake according to the present invention;

FIG. 3 is a second elevational view rotated in ninety degree fashion and illustrating the turf stake according to the present invention;

FIG. 4 is a top view of the turf stake and illustrating in more detail the interiorly hollowed cavity of the cylindrical shaped receiving body according to the present invention;

FIG. 5 is a corresponding bottom view of the turf stake and illustrating in more detail the plurality of four circumferentially spaced apart and extending vane portions for providing location and reinforcement to the spike portion according to the present invention;

FIG. 6 is a first environmental view in exploded fashion and illustrating a first application of the turf stake and frame construction assembly according to the present invention;

FIG. 7 is a further environmental view in perspective based upon the variant of FIG. 6 and further illustrating the turf stake and frame construction assembly providing an example of tree vegetation with both vertically extending support and a first type of watering/irrigation input;

DETAILED DESCRIPTION OF THE PREFERRED EMBODIMENTS

Figure 8:
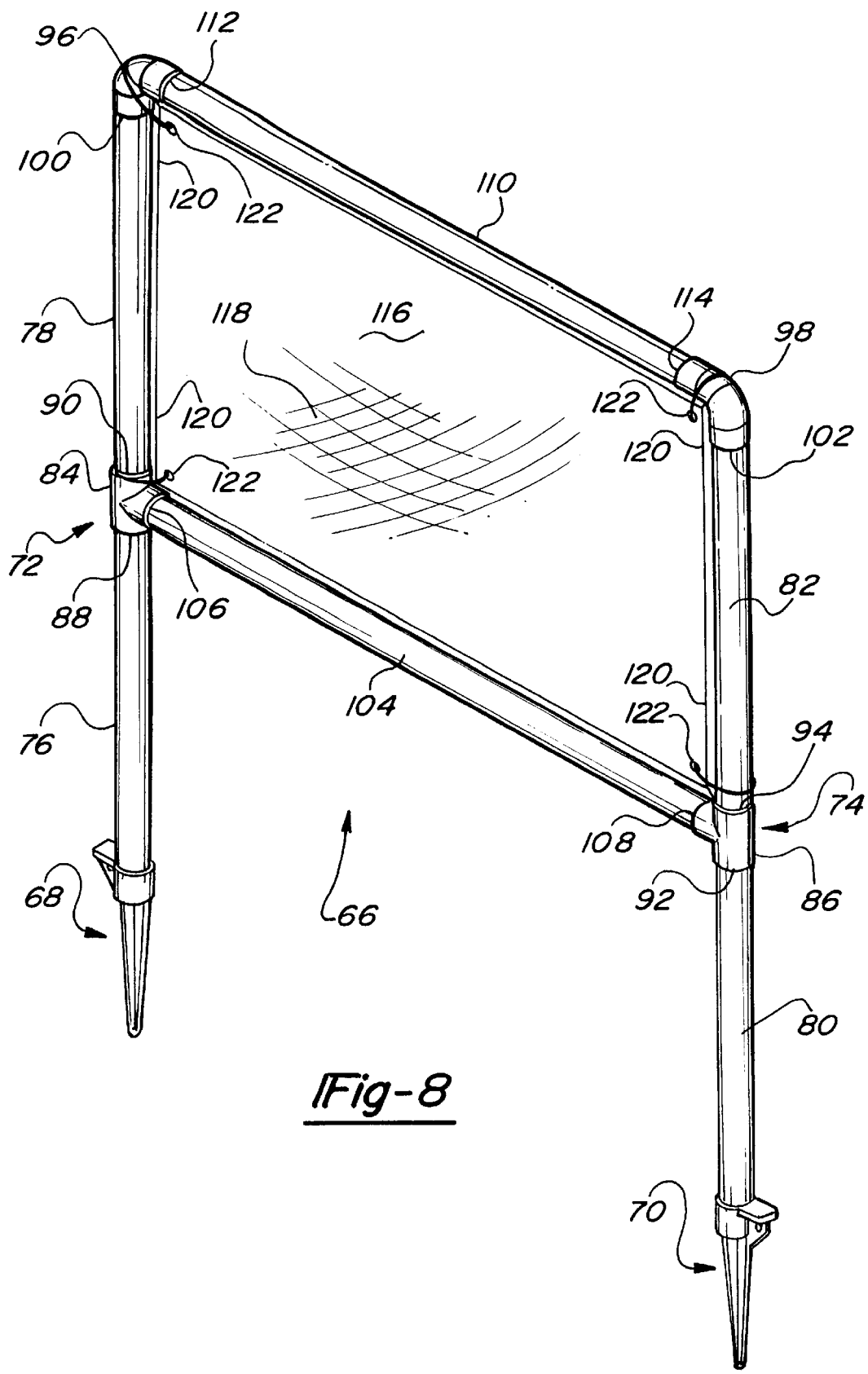
FIG. 8 is a second environmental view in perspective and illustrating a second application of the turf stake and frame construction assembly for providing a display sign according to the present invention.

Referring to FIGS. 1–5, a perspective view, as well as front, side, top and bottom elevational views are shown of the turf stake 10 forming a part of the turf stake and frame construction assembly according to the present invention. The turf stake 10 is preferably constructed of a hardened plastic or other durable material. A non-metallic construction is however preferred to avoid future complications such as corrosion which would otherwise result from the stake 10 being embedded within the ground for a long period of time.

Referring again particularly to FIGS. 1–3 and 5 in combination, the turf stake includes an elongate spike portion 12 with a first lower inserting end 14, a second upper supporting end 16 and a plurality of first 18, second 20, third 22 and fourth 24 circumferentially spaced apart vane portions which extend in axially directed fashion between the first inserting end 14 and the second supporting end 16 along the spike portion 12. The overall dimensions of the spike portion 12 and circumferentially arrayed vanes 18, 20, 22 and 24 are further such that they are at a widest circumference at the upper end 16 and narrow down to a pointed tip at the lower end 14. As is further best viewed from the bottom end and cross sectional illustration of FIG. 5, webbed connections are provided between the vanes, as particularly identified by webbed connection 26 between vanes 18 and 20, and provide additional reinforcing support of the overall axially extending spike portion 12. It is further evident from FIG. 5 that four such webbed connections are illustrated between succeeding vanes around the circumference of the turf stake device. It is also understood that any number of circumferentially arrayed and extending vanes could be employed, ranging from one to several and without departing from the scope of this invention. The preferred embodiment however illustrates the four vane portions 18, 20, 22 and 24 which are arrayed at 90 degree angular offset fashion.

Integrally formed upon the second upper and supporting end 16 of the spike portion 12 is a foundation means for accepting in inserting fashion an elongate extending member (to be subsequently described) and the preferred embodiment for the foundation means is a substantially cylindrical shaped body 28 which extends upwardly from the spike portion 12. The body 28 is defined by an upper annular surface 30 and an inner cylindrical wall 32 which defines a hollowed and interior cavity. Referring also to the top view of FIG. 4, a recessed base surface 34 is located at a bottom of the hollowed and interior cavity and, in combination with the inner cylindrical wall 32, defines the boundaries of the interior cavity.

The turf stake 10 further includes a planar surface 36 which extends in an outward and lateral direction from an upper end of the cylindrical shaped body 28 and in substantially coplanar fashion with respect to its upper annular surface 30. The planar surface 36 is, in a preferred embodiment, substantially rectangular in shape when viewed from above and has an established reinforcing thickness 38. The planar surface 36 extends in a substantially perpendicular direction with respect to the axially extending manner of the spike portion 12 and its purpose is to provide a means for absorbing and imparting a driving force generated by downwardly motion of a blunt-headed object (hammer, mallet, large wrench, etc., which is known in the art and therefore not shown) to the axially extending spike portion 12 and so that the turf stake 10 is quickly and efficiently embedded into the underground surface.

A webbed reinforcing portion 40 extends from an underside of the planar surface 36 and to exterior connecting surfaces established between the cylindrical shaped body 28 and contiguous second supporting end 16 of the spike portion 12. The reinforcing portion 40 in actuality continues on as the first axially extending vane portion 18 as it extends in the axial direction along the turf stake 10. The webbed portion 40 exhibits an established planar dimension 41 in side profile and an aperture or eyelet 42 is formed at a generally centralized location through the side planar dimension 41 of the webbed portion 40 for the reception of a cord or loop (not shown) if such is desired.

Referring further to FIG. 6, a first environmental view is illustrated at 44 of a combination turf stake 10' of a further preferred variant in use with a first elongated member 46 of a frame construction assembly according to the present invention. The turf stake 10' is a slight modification of that illustrated in FIGS. 1–5, however repeats the overall structure of a spike portion 12' with axially extending vane portions, illustrated at 18' and 24', which lead to a first inserting tip 14', a cylindrical shaped body 28' integrally secured to an upper end 16' of the spike portion 12' with an interiorly hollowed cavity, and a planar extending mounting surface 36' extending from the stake 10' which is reinforcingly supported by a webbed portion 40' and for facilitating embedding of the turf stake 10' at the selected ground location (illustrated at 4).

Referring again to FIG. 6, the elongate member 46 is illustrated in exploded arrayed and axially extending fashion relative to the turf stake 10', is illustrated in somewhat reduced length, and includes a thin walled construction 48 which defines a hollowed and axially extending interior 50. The elongate member 46 is preferably of a polyvinyl chloride (pvc) construction and its exterior diameter is sized so that it will be frictionally engaged within the inner cylindrical wall 32' of the cylindrical shaped body 28' in an axially inserting and twisting fashion. The preferred, and most efficient embodiment is to size the diameter of each elongate member so that it frictionally engages within its associated cylindrical seating body of a selected turf stake. It is however understood that it is possible for other or additional types of interengaging means to be employed for securing a selected elongate member to a selected turf stake in an axially extending fashion and included among them being linchpin and slot engagement means (not shown) formed between the respective members or other types of fastener means (also not shown). It is also understood that both the interior cylindrical shaped cavity of the turf stake and corresponding outwardly facing cross section of the inserting elongate member can be of any other desired and polygonal cross section, such matching sections permitting the elongate members to be inserted into the turf stake receiving cavities in a frictionally holding manner.

Referring again to FIG. 6, the turf stake 10' includes the additional provision of an internal fluid conduit and watering/irrigation means so that the stake 10', along with the internally hollowed and extending conduit members can provide water to surrounding vegetation or the like to which the stake 10' and elongate member 46 provides support. Specifically, a hollowed and interior axial extending passageway 52 is formed both within and along a central location of the spike portion 12' (see illustration lines in phantom) and is communicable at a first end with an inlet 54 formed in the recessed base surface 34' of the cylindrical shaped body 28'. Branching off from the axially extending and internal passageway 52 are a plurality of individual outlets 56 which in turn communicate with selected surface locations along the spike portion 12'.

Viewing the disclosure of FIG. 6 in context of the further environmental view of FIG. 7, it is clear as to how a water supply (identified in this variant by a jug 58 pouring water 60 into the hollow and interior extending passageway 50 of the selected elongate member 46) is communicated, downwardly through the elongate member, into the axially extending and interior passageway 52 within the spike portion 12 and out through the communicating outlets 56 and as is further illustrated by rivulets 62 of the fluid 60 which flow into the earth surrounding the roots of another type of vegetation 6. The vegetation 6 illustrated in this variant is of a larger tree or shrub and cords or loops 64 may be employed which encircle both the diameter of the tree/shrub and the elongate member and allow the turf stake and frame construction to function as a staking and support member in addition to an irrigation and watering means.

Referring now to FIG. 8, a further environmental view is shown at 66 of an alternative configuration of first and second turf stakes, 68 and 70, along with an assortment of assembled and interconnecting elongate members which form in combination a ground secured sign assembly. The first and second turf stakes 68 and 70 are identical in each and every respect to those described in detail in the embodiment of FIGS. 1–5, therefore a repetition of their features will not be given here.

The frame construction assembly for establishing an upwardly extending framework above the turf stakes 68 and 70 includes a first selected and overall vertically extending elongate member 72 secured to the first stake 68 and a second selected and overall vertically extending elongate member 74 secured to the second stake 70. Each of the vertically extending elongate members 72 and 74 are subdivided further into lower elongate portions and upper elongate portions and are illustrated as lower elongate portion 76 and upper elongate portion 78 for first elongate member 72 and further as lower elongate portion 80 and upper elongate portion 82 for second elongate member 74.

A first T-coupling 84 is provided for interconnecting the lower 76 and upper 78 elongate portions of the first vertical member 72 and a corresponding second T-coupling 86 provides the same interconnection between the lower 80 and upper 82 elongate portions of the second vertical member 74. Specifically, a first and downwardly extending connecting end 88 of the first T-coupling 84 receives an upper end of the lower elongate portion 76. A second and upwardly extending connecting end 90 of the T-coupling 84 in turn is engaged by a lower end of the upper elongate portion 78. In identical fashion, a first and downwardly extending connecting end 92 of the second T-coupling 86 receives an upper end of the lower elongate portion 80 and a second and upwardly extending connecting end 94 receives a lower end of the upper elongate portion 82. A first elbow coupling 96 is secured atop an upper end of the first upper elongate portion 78 at 100 and a second elbow coupling 98 is likewise secured atop an upper end of the second upper elongate portion 82 at 102.

First and second additional and elongate extending members are provided which extend in horizontal fashion between the overall vertically extending members 72 and 74. The additional and horizontally extending elongate members are illustrated by a first such member 104 which secures at one end to a third and inwardly facing connecting end 106 of the first T-coupling 84 and at the other end to a corresponding third and inwardly facing connecting end 108 of the second T-coupling 86. A second such horizontal and additional extending member 110 secures at one end to an inwardly facing connecting end 112 of the first elbow coupling 96 and at the other end to an inwardly facing connecting end 114 of the second elbow coupling 98. The first and second horizontally extending elongate members 104 and 110 are therefore spaced a sufficient distance apart so that a rectangular shaped sign 116 can be seated therein, such a sign capable of exhibiting any desired advertising indicia 118 thereon. It is further desired in this instance to employ additional loops, cords or ties 120 which can encircle the diameter of the frame construction and can be received through additional holes or eyelets 122 arrayed at the four corners of the sign 116.

Figure 9:
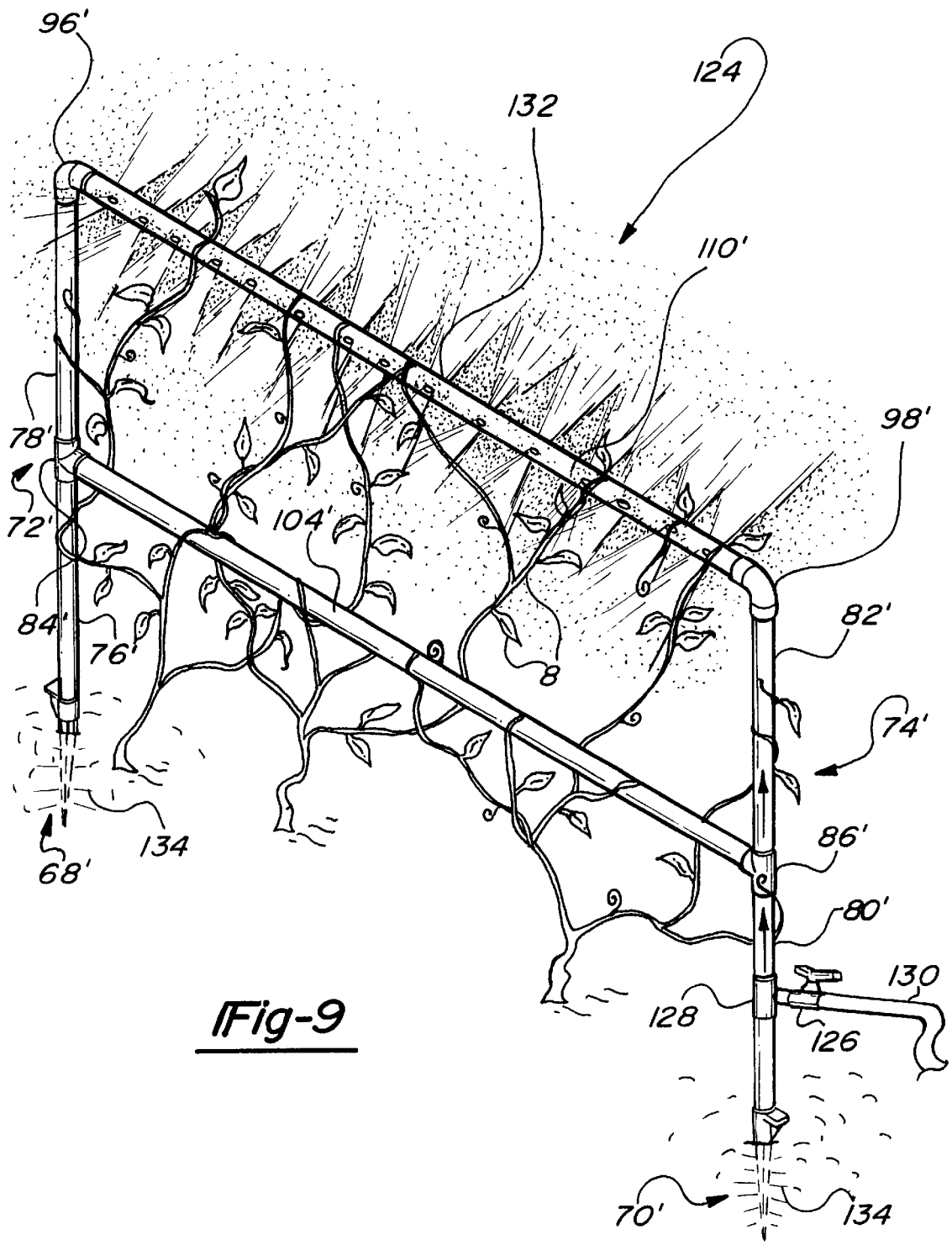
FIG. 9 is a third environmental view in perspective and illustrating a third application of the turf stake and frame construction assembly for providing an irrigation system for additional types of vegetation according to the present invention.

Referring to FIG. 9, a still further environmental variant is illustrated at 124 of the combination turf stake and frame construction assembly according to the present invention. The variant 124 is structurally similar to that illustrated at 66 in the environmental variant of FIG. 8, however in this instance is particularly configured to provide a yet further alternative means for supporting foliage 8 according to a further known array as well as providing additional watering/irrigation.

As with the embodiment of FIG. 8, a first turf stake 68' and a second turf stake 70' are provided in spaced apart and embedded fashion at selected underground locations. The turf stakes 68' and 70' in this variant may be either as provided at 10 in the first preferred embodiment (FIGS. 1–5) or as further identified at 10' in FIGS. 6 and 7 and, in this instance, possess the fluid communication means for permitting fluid flowing through the elongate members to be distributed.

First and second vertically extending and overall elongate members, see 72' and 74', are arrayed identically to those shown in FIG. 8, with the first member 72' being separated into a lower portion 76' and an upper portion 78' which are interconnected by a first T-coupling 84' and the second member 74' being separated into a lower portion 80' and an upper portion 82' interconnecting by a second T-coupling 86'. First and second elbow couplings 96' and 98' attach to upper ends of the first and second upper elongate portions 78' and 82', respectively, and first 104' and second 110' additional and horizontally extending elongate members extend between the T-couplings and elbow couplings again as identically illustrated in FIG. 8.

As was previously described, the elongate members are typically internally hollowed conduit members and, in the instance of the variant 124, facilitate the creation of an internal fluid carrying network upon being assembled above the turf stakes 68' and 70'. A pressurized fluid source can be introduced according to this variant at any desired location along the fluid network and is illustrated by a faucet 126 feeding into a connected coupling 128 (located in this instance along the second lower elongate portion 80') and fed by an attachable hose 130. Since the entirety of the frame construction is fluid carrying, water can be issued in the form of spray mist or streams both from apertures 132 formed along any selected elongate member (in this instance second additional member 110' extending horizontally) and also as is shown distributed through the turf stakes 68' and 70' at 134 (the turf stakes in this instance again being of the type described as 10' in FIG. 6) for properly irrigating and watering the foliage 8 which is otherwise supported upon the various elongate members making up the framework assembly.

Figure 10:
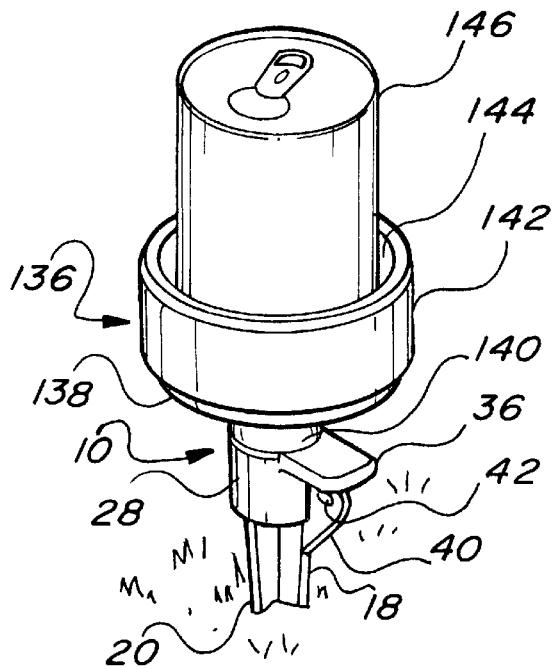
FIG. 10 is a fourth environmental view in perspective and illustrating a fourth application of the turf stake and frame construction assembly for providing a can or bottle holder receptacle according to the present invention.

Referring to FIG. 10, a yet further variant of the combination turf stake and frame construction assembly is shown at 136 and includes the provision of a single turf stake 10 as described in the first preferred embodiment. The turf stake 10 once again includes the elongate spike portion illustrated substantially driven into the ground turf and revealing vanes 18 and 20 which are shown projecting upwardly therefrom. The cylindrical shaped body 28 is again shown integrally formed and extending upwardly from the spike portion, along with the interconnecting and webbed reinforcing portion 40 with eyelet 42.

The frame construction employed in the assembly 136 is characterized by a receptacle holder 138 which includes a lower and smaller diameter cylindrical pedestal support 140. The pedestal support 140 is sized so that it will engage in the desired friction fit manner within the open interior of the upper cylindrical body and, for purposes of this disclosure, the pedestal support qualifies as a portion of a suitable elongate member. Interconnected to and extending upwardly from the pedestal support 140 is an upper and larger diameter cylindrical shaped holder member 142 (also forming a part of a designated elongated member), the holder member 142 further being characterized by an open top and open interior bounded by an inner cylindrical wall 144. A substantially cylindrical shaped object (shown in FIG. 10 as an aluminum can 146) may be set within the holder member 142 and is supported upon a base inner surface (not evident) of the holder 142. It is also understood that any other object having a substantially cylindrical cross section, such as a bottle or even other non-beverage item, may be supported within the holder member 142 and within the boundaries of the present disclosure.

Figure 11:
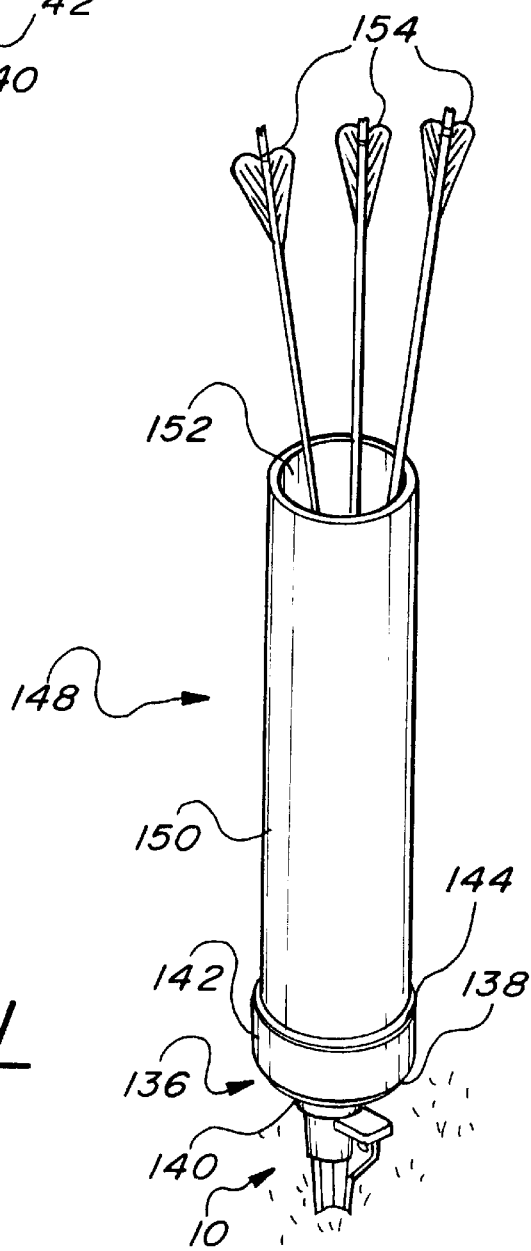
FIG. 11 is a fifth and final environmental view in perspective and illustrating a fifth application of the turf stake and frame construction assembly for providing an arrow holder receptacle according to the present invention.

Referring finally to FIG. 11, a further variation 148 of the frame construction assembly (employing the structure illustrated at 136 in FIG. 10) is illustrated according to the present invention and includes an elongate and hollowed cylindrical sleeve 150 according to a selected diameter and axial length and which is dimensioned so that a selected end frictionally engages against the inner cylindrical wall 144 of the holder member 142 so as to extend in an upward manner. The sleeve is further illustrated by an open top and an inner cylindrical wall 152. A plurality of elongate objects, in this instance arrows 154, may be insertably supported within the affixed sleeve 150 so that this particular variation of the present invention assembly may serve effectively as a bow hunter accessory. It is further understood that, rather than providing a separably attachable sleeve 150 in the construction assembly 136 in the design of FIG. 10, such an elongate sleeve may be provided as an integrally formed member with a like designed assembly 136.

It is therefore apparent that the present invention as disclosed throughout the several embodiments, teaches a novel and unique turf stake and frame construction assembly for assembling any type of framework structure above earthen ground, such framework structure capable of providing any type of sign support, construction support, irrigation or other obvious or intended purpose as clearly suggested by the preceding disclosure. The turf stake disclosed herein is further asserted to be novel and unique apart from any other staking devices known in the prior art, both according to its own integral construction as well as its ability to frictionally engage and secure axially extending ends of attaching elongate members.

Additional preferred embodiments will therefore become apparent to those skilled in the art to which the present invention pertains and without departing from the scope of the appended claims.

I claim:

1. A turf stake for use in assembling an above-ground structural assembly, the structural assembly including any number of individual and elongate members, each of the elongate members being cylindrical shaped in cross section, said turf stake capable of being forcibly engaged by a blunt headed object to a selected underground location and comprising:

an elongate spike portion having a first inserting end, a second supporting end and a plurality of vane portions projecting in circumferentially spaced apart and axially directed fashion substantially along said spike portion;

said turf stake further including foundation means integrally formed upon said second supporting end of said spike portion, said foundation means including a substantially cylindrical shaped body defining a hollowed and interior cavity, a selected end of a corresponding cylindrical shaped elongate member capable of being received in a twisting, inserting and frictionally engaging manner within said hollowed and interior cavity so that the selected elongate member extends in an upward and axial direction away from said turf stake; and said turf stake further including a planar surface extending in a laterally directed fashion from an upper end of said foundation means and with respect to said spike portion, a webbed reinforcing portion extending from an underside of said planar surface and to exterior connecting surfaces established between said cylindrical shaped body and said second supporting end of said spike portion, said planar surface capable of imparting a driving force created by downward motion of said blunt-headed object to said first inserting end of said spike portion to facilitate engagement of said turf stake to the underground location.

2. The turf stake according to claim 1, said plurality of vane portions further comprising a first vane portion, a second vane portion, a third vane portion and a fourth vane portion, said vane portions extending in axial fashion along said spike portion and at 90 degree angular increments.

3. The turf stake according to claim 1, further comprising an axially extending passageway formed within a central location of said spike portion, said passageway being communicable with an inlet formed in a recessed base surface of said cylindrical shaped body, said passageway further being communicable with a plurality of individual outlets extending from said axially extending passageway and to selected surface locations of said elongate spike portion.

4. The turf stake according to claim 1, said plurality of vane portions comprising first, second, third and fourth circumferentially spaced apart and axially extending vanes, said turf stake being constructed of a hardened plastic material.

5. A combination turf stake and frame construction assembly, comprising:

said turf stake including an elongate spike portion having a first inserting end, a second supporting end and a plurality of vane portions projecting in circumferentially spaced apart and axially directed fashion substantially along said spike portion;

said turf stake further including foundation means integrally formed upon said second supporting end of said spike portion for supporting said frame construction, a planar surface extending in a laterally directed fashion from an upper surface of said foundation means and with respect to said spike portion and capable of being forcibly engaged by a blunt headed object to embed said elongate spike portion of said turf stake into a selected underground location; and said frame construction including at least one elongate member which is polygonal shaped in cross section, said foundation means further including a substantially polygonal shaped body defining a hollowed and interior cavity which substantially corresponds to a selected polygonal shaped end of said elongate member, said selected end of said elongate member being received in a frictionally engaging manner within said foundation means so that said elongate member extends in an upward and axial direction away from said turf stake; and a webbed reinforcing portion extending from an underside of said planar surface and to exterior connecting surfaces established between said polygonal shaped body and said second supporting end of said spike portion.

6. The combination turf stake and frame construction assembly according to claim 5, further comprising an aperture formed within said webbed reinforcing portion and defined by an annular extending wall.

7. The combination turf stake and frame construction assembly according to claim 5, said plurality of vane portions further comprising a first vane portion, a second vane portion, a third vane portion and a fourth vane portion, said vane portions extending in axial fashion along said spike portion and at 90 degree angular increments.

8. The combination turf stake and frame construction assembly according to claim 5, further comprising a first turf stake embedded within said underground surface at a first selected location and a second turf stake embedded within said underground surface at a second selected location, a first selected elongate member of said frame construction securing to said first turf stake, a second selected elongate member securing to said second turf stake and at least one additional elongate member securing at opposite ends to said first and second elongate members and extending therebetween.

9. The combination turf stake and frame construction assembly according to claim 8, said first selected elongate member and said second selected elongate member each further comprising a lower elongate portion and an upper elongate portion, said lower elongate portions securing at lower ends to said first and second turf stakes, respectively, a first connecting end of a T-coupling securing to upper ends of each of said lower elongate portions, said upper elongate portions securing at lower ends to a second connection of said T-couplings and an elbow coupling securing to upper ends of each of said second upper elongate portions.

10. The combination turf stake and frame construction assembly according to claim 9, further comprising a first additional and extending elongate member securing at opposite ends to third and opposingly facing connecting ends of said T-couplings, a second additional and extending elongate member securing at opposite ends to said elbow couplings.

11. The combination turf stake and frame construction assembly according to claim 10, said plurality of elongate extending members each being internally hollowed so that, upon being interconnected together, establish a continuous fluid carrying internal network, a plurality of spaced apart apertures being formed at selected locations in exterior facing surfaces of said elongate extending members and in communication with said fluid carrying network so that, upon application of a pressurized fluid source to any location of said network, a plurality of discrete watering streams will be issued from said frame construction assembly.

12. The combination turf stake and frame construction assembly according to claim 5, further comprising a plurality of individual turf stakes and interconnecting and elongate extending frame construction members, said turf stakes being constructed of a hardened plastic material and said frame construction members being constructed of a polyvinyl chloride material.

13. A combination turf stake and frame construction assembly, comprising:

said turf stake including an elongate spike portion having a first inserting end, a second supporting end and a plurality of vane portions projecting in circumferentially spaced apart and axially directed fashion substantially along said spike portion;

said turf stake further including foundation means integrally formed upon said second supporting end of said spike portion for supporting said frame construction, a planar surface extending in a laterally directed fashion from an upper surface of said foundation means and with respect to said spike portion and capable of being forcibly engaged by a blunt headed object to embed said elongate spike portion of said turf stake into a selected underground location;

said frame construction including at least one elongate member which is polygonal shaped in cross section, said foundation means further comprising a substantially polygonal shaped body defining a hollowed and interior cavity which substantially corresponds to a selected polygonal shaped end of said elongate member, said selected end of said elongate member being received in a frictionally engaging manner within said foundation means so that said elongate member extends in an upward and axial direction away from said turf stake; and an axially extending passageway formed within a central location of said spike portion, said passageway being communicable with an inlet formed in a recessed base surface of said polygonal shaped body, said passageway further being communicable with a plurality of individual outlets extending from said axially extending passageway and to selected surface locations of said elongate spike portion, said frictionally engaged elongate member being internally hollowed and capable of communicating a pourable fluid through said turf stake and out through said individual outlets.

* * * * *

UNITED STATES PATENT AND TRADEMARK OFFICE
CERTIFICATE OF CORRECTION

PATENT NO. : 5,881,495

DATED : March 16, 1999

INVENTOR(S) : J. Matthew Clark

It is certified that error appears in the above-identified patent and that said Letters Patent is hereby corrected as shown below:

Column 8, line 64 - Insert --, and further comprising an aperture formed within said webbed reinforcing portion-- after "location".

Signed and Sealed this

Seventh Day of September, 1999

Attest:

Q. TODD DICKINSON

Attesting Officer     Acting Commissioner of Patents and Trademarks